(12) United States Patent
Rakshit

(10) Patent No.: US 9,020,876 B2
(45) Date of Patent: Apr. 28, 2015

(54) ON-DEMAND SUGGESTION FOR VEHICLE DRIVING

(75) Inventor: Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 398 days.

(21) Appl. No.: 13/490,682

(22) Filed: Jun. 7, 2012

(65) Prior Publication Data

US 2013/0332402 A1  Dec. 12, 2013

(51) Int. Cl.
*G06N 5/02* (2006.01)
*G01C 21/34* (2006.01)

(52) U.S. Cl.
CPC ............. *G01C 21/3453* (2013.01); *G06N 5/02* (2013.01); *G01C 21/3415* (2013.01); *G01C 21/3461* (2013.01); *B60W 2550/402* (2013.01)

(58) Field of Classification Search
CPC .......... G01C 21/34–21/3492; B60W 2550/402
USPC .................................................. 701/400–541
See application file for complete search history.

(56) References Cited

U.S. PATENT DOCUMENTS

| | | | |
|---|---|---|---|
| 5,124,915 A | 6/1992 | Krenzel | |
| 5,177,685 A | 1/1993 | Davis et al. | |
| 7,092,937 B2 | 8/2006 | Morgan et al. | |
| 7,129,825 B2 * | 10/2006 | Weber | 340/425.5 |
| 7,941,270 B2 * | 5/2011 | Hughes | 701/421 |
| 7,974,748 B2 | 7/2011 | Goerick et al. | |
| 8,818,725 B2 * | 8/2014 | Ricci | 701/519 |
| 2003/0018616 A1 | 1/2003 | Wilbanks et al. | |
| 2009/0005959 A1 | 1/2009 | Bargman et al. | |
| 2009/0037465 A1 | 2/2009 | Marti et al. | |
| 2011/0054778 A1 | 3/2011 | Poiesz et al. | |

FOREIGN PATENT DOCUMENTS

WO   WO2008018906 A2   2/2008

OTHER PUBLICATIONS

"Specification of Knowledge Database on Guidelines and Design Criteria", 6th Framework Programme—Priority 2 "Information Society Technologies", Institute for the Protection and Security of the Citizen, Mar. 31, 2008.

(Continued)

*Primary Examiner* — Stanley K Hill
(74) *Attorney, Agent, or Firm* — Law Offices of Ira D. Blecker, P.C.

(57) ABSTRACT

A method of on-demand suggestion for vehicle driving which includes: providing a centralized vehicle driving knowledgebase containing previously-stored information pertaining to vehicle driving situations; responsive to a request for information pertaining to navigating a particular road situation, collecting current parameters pertaining to a current vehicle driving situation; providing the current parameters to the centralized vehicle driving knowledgebase; evaluating the current parameters with respect to the information previously stored in the centralized vehicle driving knowledgebase; and providing at least one suggestion to a vehicle for navigating the particular road situation. Also included is a computer program product for providing an on-demand suggestion for vehicle driving and a vehicle helping system.

14 Claims, 3 Drawing Sheets

(56) References Cited

OTHER PUBLICATIONS

Martin Burger et al., "Intelligent Vehicle Technologies Expert System for Driver Assistance System", URL: http://www-itec.uni-klu.ac.at/~mwaltl/papers/SEIVTExpertSystems.pdf, all pages, unknown date but the year of publication is sufficiently earlier than the effective U.S. filing date that the month and year of publication is not in issue, Applicant admitted Prior Art.

Sun Enji et al., "GPS and Google Earth based 3D assisted driving system for trucks in surface mines", Mining Science and Technology, vol. 20 (2010), p. 138-142. The year of publication is sufficiently earlier than the effective U.S. filing date that the particular month of publication is not in issue.

"Ontology (Information Science)", from Wikipedia (downloaded from the internet), URL: http://en.wikipedia,org/wiki/Ontology_(information_science), downloaded Jan. 11, 2012.

Shu-Hsien Liao et al., "Ontology-based data mining approach implemented for sport marketing", Expert Systems with Applications, 36 (2009), p. 11045-11056. The year of publication is sufficiently earlier than the effective U.S. filing date that the particular month of publication is not in issue.

Ravikarn Punnarut et al., "A Researcher Expertise Search System Using Ontology-Based Data Mining", Proc. 7th Asia-Pacific Conference on Conceptual Modelling (APCCM 2010), Jan. 2010, Brisbane, Australia, all pages.

\* cited by examiner

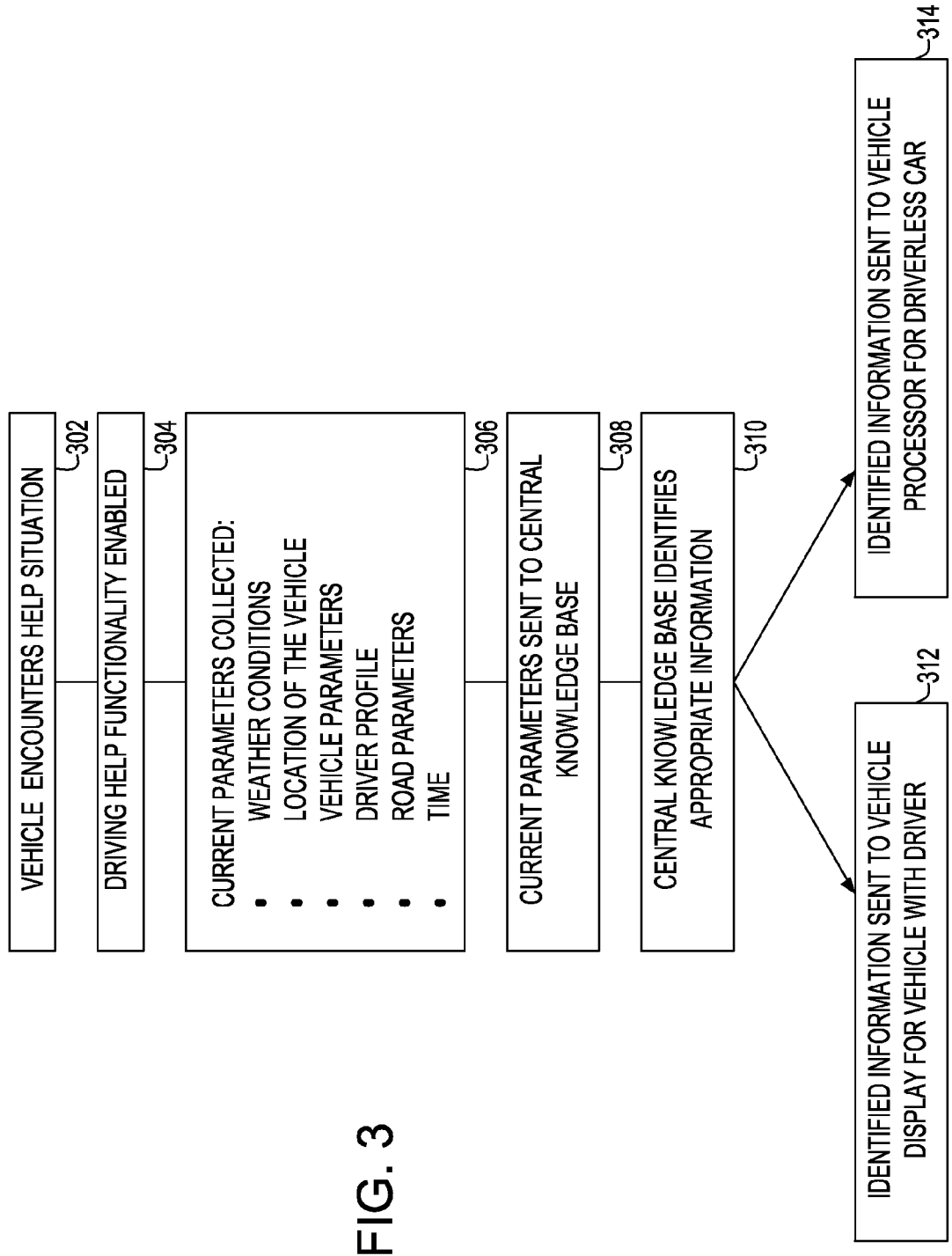

ON-DEMAND SUGGESTION FOR VEHICLE DRIVING

BACKGROUND

The present invention relates to suggestions to assist in the driving of a vehicle and, more particularly, relates to on-demand suggestions provided by a central knowledgebase to assist in the driving of vehicles which may have a driver or may be driverless.

There may be situations when a driver of a vehicle encounters a situation that is unfamiliar to the driver. The situation may be a weather condition or a road condition or it may even be that the driver is in unfamiliar territory. The driver may wish to contact a resource to provide helpful information to help the driver resolve the situation.

In the case of a driverless vehicle, the vehicle may need up-to-date information to navigate the situation.

BRIEF SUMMARY

The various advantages and purposes of the exemplary embodiments as described above and hereafter are achieved by providing, according to a first aspect of the exemplary embodiments, a method of on-demand suggestion for vehicle driving which includes: providing a centralized vehicle driving knowledgebase containing previously-stored information pertaining to vehicle driving situations; responsive to a request for information pertaining to navigating a particular road situation, collecting current parameters pertaining to a current vehicle driving situation; providing the current parameters to the centralized vehicle driving knowledgebase; evaluating the current parameters with respect to the information previously stored in the centralized vehicle driving knowledgebase; and providing at least one suggestion to a vehicle for navigating the particular road situation; wherein the method is performed by one or more data processing apparatus.

According to a second aspect of the exemplary embodiments, there is provided a computer program product for providing an on-demand suggestion for vehicle driving, the computer program product including a computer readable non-transitory storage medium having computer readable program code embodied therewith. The computer readable program code including: computer readable program code configured to provide a centralized vehicle driving knowledgebase containing previously-stored information pertaining to vehicle driving situations; responsive to a request for information pertaining to navigating a particular road situation, computer readable program code configured to collect current parameters pertaining to a current vehicle driving situation; computer readable program code configured to provide the current parameters to the centralized vehicle driving knowledgebase; computer readable program code configured to evaluate the current parameters with respect to the information previously stored in the centralized vehicle driving knowledgebase; and computer readable program code configured to provide at least one suggestion to a vehicle for navigating the particular road situation.

According to a third aspect of the exemplary embodiments, there is provided a vehicle helping system which includes: a central computing server for receiving and storing information in a knowledgebase pertaining to vehicle driving situations; a weather sensor network for determining current environmental parameters and sending the environmental parameters to the central computing server, the central computing server storing the environmental parameters; at least one video device for visualizing current road parameters and sending the road parameters to the central computing server, the central computing server storing the road parameters; responsive to a navigational signal from a vehicle, receiving and storing current vehicle parameters; the central computing server evaluating the current environmental parameters, road parameters and vehicle parameters with respect to information stored in the knowledgebase to identify appropriate information to handle various driving situations and providing to a vehicle at least one suggestion from the appropriate information for handling a particular driving situation.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 3 is a flow chart illustrating an exemplary embodiment of providing helpful information to a vehicle.

DETAILED DESCRIPTION

The exemplary embodiments pertain to an automatic centralized vehicle driving knowledgebase that may be created and accessed by a plurality of vehicles. Any vehicle may use the knowledge from the centralized knowledgebase.

If a vehicle driver wants a driving suggestion in any given driving scenario, the centralized knowledgebase may provide that driving suggestion which may be displayed to the driver. The driver may choose to follow that driving suggestion or not.

Similarly, a so-called "driverless vehicle" may also receive a driving suggestion from the centralized knowledgebase. The driving suggestion may be processed by an on-board computer processor and executed according to the protocol of the on-board computer processor.

Figure 1:
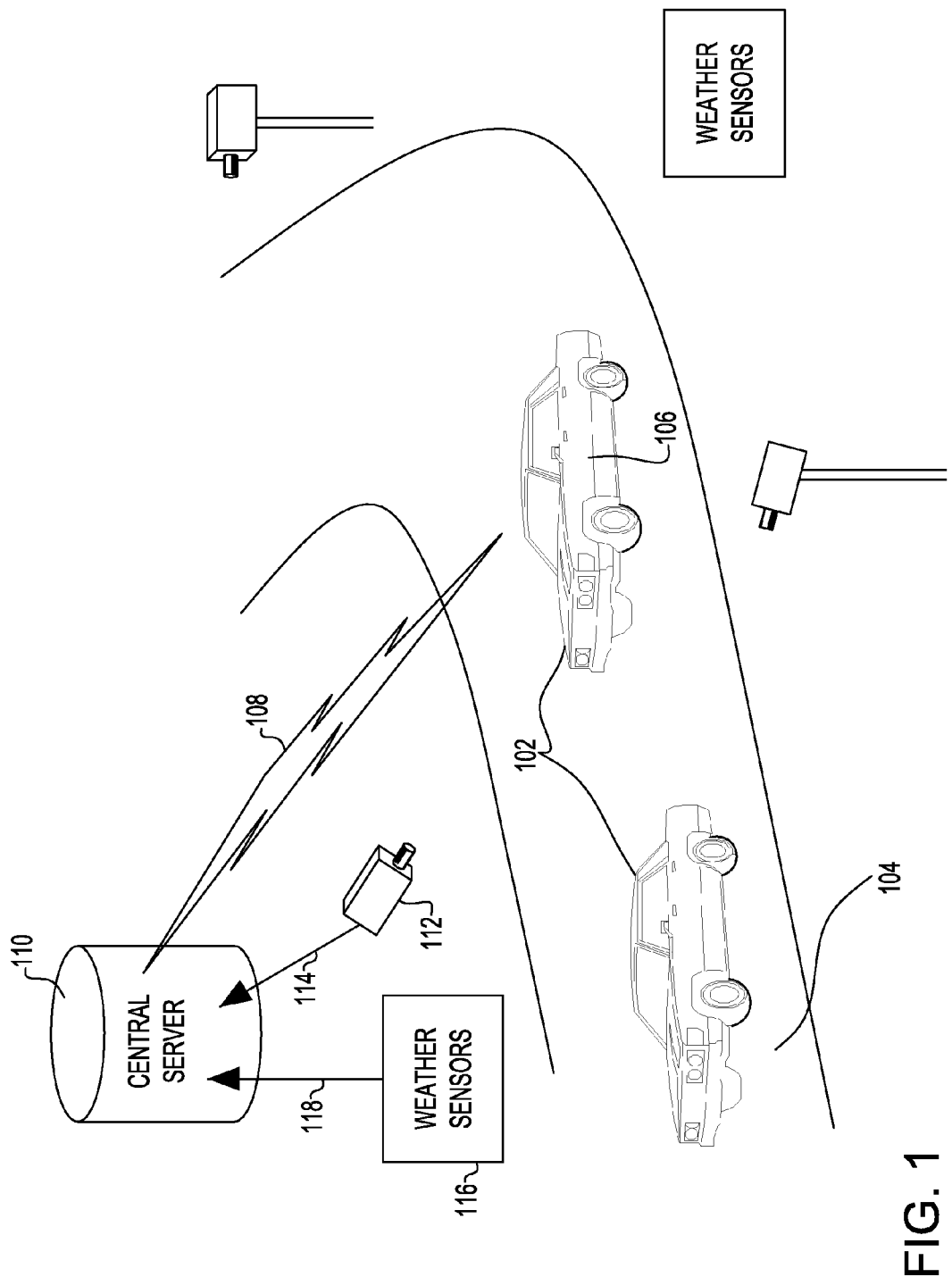
FIG. 1 is an illustration of an exemplary embodiment wherein a central server may receive information such as video information, weather information and vehicle information and provide helpful information to a vehicle.

Referring now to FIG. 1, an exemplary embodiment is illustrated. A plurality of vehicles 102 are proceeding on a roadway 104. The plurality of vehicles 102, for purposes of illustration and not limitation, are automobiles. It should be understood that the exemplary embodiments are applicable to any vehicle including motorcycles, trucks, vans and tractor trailers. One of the vehicles 106 may have a navigational device, such as a global positioning system, which may communicate wirelessly 108 with a central server computing apparatus 110 (hereafter just central server) on which a centralized knowledgebase may be stored. Vehicle 106 may also communicate information relating to the vehicle, such as speed of the vehicle, as well as information relating to the driver of the vehicle.

The exemplary embodiments may further include a plurality of video devices 112 proximate to the roadway 104 to provide video and audio information by wireless or wired means 114 to the central server 110. The video information may pertain to the condition of the roadway 104 or to any of the area surrounding the roadway 104. The video information may also show accidents, traffic or other impediments to travel. The video devices 112 may be any devices now or hereafter invented that may provide a video signal to the central server 110. For purposes of illustration and not limitation, the video devices may be video cameras.

It would also be desirable to have weather sensors 116 to provide weather-related information such as wind speed, temperature and precipitation. Weather sensors 116 are schematically illustrated and may be any devices that are capable of providing weather-related information. For example, for purposes of illustration and not limitation, the weather sensors 116 may include an anemometer for measuring wind speed, a thermometer to measure temperature and a rain/snow guage to measure precipitation. The weather sensors 116 may also include a video device to provide a visual of the weather at any point in time.

Figure 2:
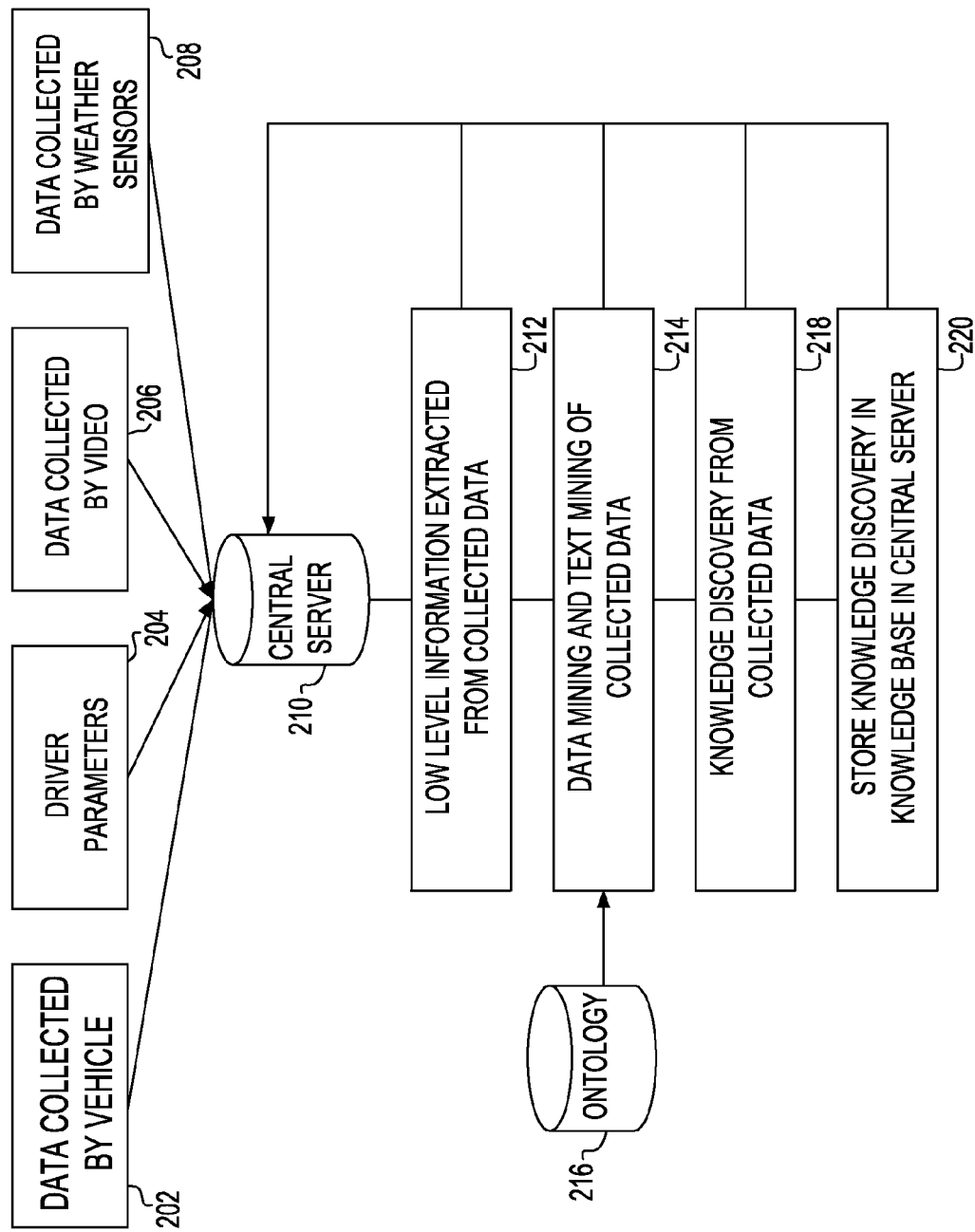
FIG. 2 is an illustration of building a knowledgebase in a central server.

Referring now to FIG. 2, the process of building a knowledgebase is described. As noted with respect to FIG. 1, certain information may be provided to the central server 110. As represented by box 202, data collected by the vehicle (vehicle 106 in FIG. 1) may be provided to the central server, now reference number 210. This data may include, but not be limited to, the speed, gear level, dimensions, make, model, age, mileage, tire wear of the vehicle. Such data may be provided to central server 210 by the GPS system (or other navigational device) residing in the vehicle 106.

According to box 204, driver parameters may be provided to the central server 210, again by the GPS system (or other navigational device) residing in the vehicle 106. The driver parameters may be manually input into the GPS system (or other navigational device) or, more expeditiously, by a unique identity card that may be inserted into the GPS system (or other navigational device) or elsewhere in the vehicle 106. The driver parameters may include but not be limited to the driver's experience, age, disabilities, etc. If the vehicle 106 is a driverless vehicle, entry of the driver parameters may be unnecessary.

Data collected by video (112 in FIG. 1), box 206, may include but not be limited to road conditions such as condition of the road (e.g., paved or gravel), surface friction, hardness and weather condition of the road such as dry, wet, icy or snowy. Audio may also be collected from the video devices 112. The data collected by video may be sent to the central server 210 by wired or wireless means.

Lastly, data collected by weather sensors (116 in FIG. 1), box 208, may be sent by wired or wireless means to central server 210. Data collected by weather sensors may include but not be limited to weather/environmental parameters such as wind speed, visibility, humidity, temperature and precipitation. This data may also include visual information from a video source within the sensor networks to report on weather conditions that may be affecting the road surface.

Referring still to FIG. 2, low level information may be extracted from the collected data, box 212. This low level information may include but not be limited to human and non-human objects and sounds, such as back ground sound patterns, identified from the video, weather data, vehicle data and driver parameters.

Next, as indicated in box 214, data mining and/or text mining of the collected data commences. In most circumstances, data mining and text mining may commence together. The collected data may be video/image/audio information, driver data, vehicle data, weather data and environmental data. Data mining and text mining may be based on ontology 216 or other conventional means. Ontology, as defined in computer science and information science, formally represents knowledge as a set of concepts within a domain and the relationships between those concepts. Ontologies are the structural frameworks for organizing information and are used in artificial intelligence, the Semantic Web, systems engineering, software engineering, biomedical informatics, library science, enterprise bookmarking, and information architecture as a form of knowledge representation about the world or some part of it.

As indicated by box 218, knowledge may be discovered from the collected data. Different rules may be created. Some examples of rules may be how to handle different driving situations or what are possible predicted accident scenarios. Video clips from the collected video data may also be extracted. Successful execution of difficult driving situations and accident situations may also be extracted. Traffic history and accident history pertaining to the roadway may also be extracted.

Referring now to box 220, the knowledge discovered or extracted may be stored in a knowledgebase which, in turn, may be stored in the central server 210. It is within the scope of the exemplary embodiments to have the knowledgebase and central server 210 be the same computing apparatus.

The previous processes of low level extraction of information (box 212), data mining and text mining (box 214), knowledge discovery (box 218) and knowledge storing (box 220) may be accomplished by functionalities within the central server 210. However, it is within the scope of the exemplary embodiments to have these four processes performed by a standalone computer apparatus and then provide by the standalone computer apparatus the knowledge to be stored to the central server 210.

Referring now to FIG. 3, there is illustrated an exemplary embodiment in which a vehicle encounters a situation in which assistance or help may be required as indicated by box 302. The situation may be any of the situations discussed previously such as unfamiliar driving territory, traffic, road conditions, accidents, etc. The vehicle may be one driven by a driver or a driverless vehicle.

A functionality in the vehicle may be enabled, box 304 to get help from the knowledgebase to assist with the driving situation indicated by box 302. The GPS (or other navigational device) may also have the capability, such as cellular capability, to directly communicate with the knowledgebase. Alternatively, there may be a separate communication device, such as a cellular device, paired with the GPS (or other navigational device) to communicate with the knowledgebase.

Next, as indicated in box 306, current parameters are collected by the central server discussed previously with respect to FIGS. 1 and 2. Some of these parameters may include but not be limited to the current weather conditions, location of the vehicle, vehicle parameters, driver profile, road parameters and time. While it may be preferable to collect all of these parameters, it is within the scope of the exemplary embodiments to collect only some of these parameters. For example, some vehicles may not be able to provide driver profile information to the central server. Each of these parameters may be collected by the apparatus discussed previously including but not limited to the GPS in the vehicle, video devices and weather sensors.

The collected current parameters may be sent to the knowledgebase within the central server, box 308.

As represented by box 310, evaluating the current parameters provided to the knowledgebase with respect to parameters stored in the knowledgebase, which may include applying any applicable rules, the knowledgebase may identify information that is appropriate to the driving situation encountered in box 302.

The identified information may then be sent via GPS (or similar apparatus) from the knowledgebase to the vehicle. If the vehicle is one driven by a driver, the identified information may be sent to a vehicle display for viewing by the driver, box 312. If the driver wants more information, the driver may request a video clip for guidance on how to handle the driving situation. If the vehicle is driverless, the identified information may be sent to an on-board computer processor in the vehicle for execution by the on-board computer processor, box 314.

As will be appreciated by one skilled in the art, aspects of the exemplary embodiments may be embodied as a system, method, service method or computer program product. Accordingly, aspects of the exemplary embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the exemplary embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the exemplary embodiments may be written in any combination of one or more programming languages, including an object oriented programming language such as Java, Smalltalk, C++ or the like and conventional procedural programming languages, such as the "C" programming language or similar programming languages or even Microsoft Excel/Access. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the exemplary embodiments may have been described above with reference to flowchart illustrations and/or block diagrams of methods, apparatus (systems) and computer program products according to the exemplary embodiments. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods, service methods and computer program products according to the exemplary embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of on-demand suggestion for vehicle driving comprising:
    collecting by a weather sensor network environmental parameters;
    collecting by a video network visual road parameters;
    collecting vehicle parameters from a plurality of vehicles;
    storing the environmental parameters, visual road parameters and vehicle parameters in a centralized vehicle driving knowledgebase;
    discovering knowledge from the centralized vehicle driving knowledgebase pertaining to vehicle driving situations affected by the environmental parameters, visual road parameters and vehicle parameters;
    formulating rules based on the knowledge pertaining to the environmental parameters, visual road parameters and vehicle parameters for handling various driving situations;
    storing the rules in the centralized vehicle driving knowledgebase;
    responsive to a request for information pertaining to handling a particular road situation, collecting current parameters pertaining to a current vehicle driving situation;
    providing the current parameters to the centralized vehicle driving knowledgebase;
    evaluating the current parameters with respect to the environmental parameters, visual road parameters and vehicle parameters stored in the centralized vehicle driving knowledgebase to identify appropriate information to handle the current vehicle driving situation; and
    providing at least one suggestion from the appropriate information to a vehicle for handling the particular driving situation;
    wherein the method is performed by one or more data processing apparatus.

2. The method of claim 1 wherein the current parameters relate to environmental parameters, visual road parameters, vehicle parameters.

3. The method of claim 1 wherein the at least one suggestion is provided to the vehicle for display by the vehicle.

4. The method of claim 3 wherein the at least one suggestion is a video clip.

5. The method of claim 1 wherein the at least one suggestion is provided to a computer processor in the vehicle.

6. A computer program product for providing an on-demand suggestion for vehicle driving, the computer program product comprising:
    a computer readable non-transitory storage medium having computer readable program code embodied therewith, the computer readable program code comprising:
    computer readable program code configured to collect environmental parameters from a weather sensor network;
    computer readable program code configured to collect visual road parameters from a video network;
    computer readable program code configured to collect vehicle parameters from a plurality of vehicles;
    computer readable program code configured to store the environmental parameters, visual road parameters and vehicle parameters in a centralized vehicle driving knowledgebase;
    computer readable program code configured to discover knowledge from the centralized vehicle driving knowledgebase pertaining to vehicle driving situations affected by the environmental parameters, visual road parameters and vehicle parameters;
    computer readable program code configured to formulate rules based on the knowledge pertaining to the environmental parameters, visual road parameters and vehicle parameters for handling various driving situations;
    computer readable program code configured to store the rules in the centralized vehicle driving knowledgebase;
    responsive to a request for information pertaining to handling a particular road situation, computer readable program code configured to collect current parameters pertaining to a current vehicle driving situation;
    computer readable program code configured to provide the current parameters to the centralized vehicle driving knowledgebase;
    computer readable program code configured to evaluate the current parameters with respect to the environmental parameters, visual road parameters and vehicle parameters stored in the centralized vehicle driving knowledgebase to identify appropriate information to handle the current vehicle driving situation; and
    computer readable program code configured to provide at least one suggestion from the appropriate information to a vehicle for navigating the particular road situation.

7. The computer program product of claim 6 wherein the current parameters relate to environmental parameters, visual road parameters, and vehicle parameters.

8. The computer program product of claim 6 wherein the at least one suggestion is provided to the vehicle for display by the vehicle.

9. The computer program product of claim 8 wherein the at least one suggestion is a video clip.

10. The computer program product of claim 6 wherein the at least one suggestion is provided to a computer processor in the vehicle.

11. A vehicle helping system comprising:
    a central computing server for receiving and storing information in a knowledgebase pertaining to vehicle driving situations;
    a weather sensor network for determining current environmental parameters and sending the environmental parameters to the central computing server, the central computing server storing the environmental parameters;
    at least one video device for visualizing current road parameters and sending the road parameters to the central computing server, the central computing server storing the road parameters;
    responsive to a navigational signal from a vehicle, receiving and storing current vehicle parameters;
    the central computing server evaluating the current environmental parameters, road parameters and vehicle parameters with respect to information stored in the knowledgebase to identify appropriate information to handle various driving situations and providing to a vehicle at least one suggestion from the appropriate information for handling a particular driving situation.

12. The vehicle helping system of claim 11 wherein the environmental parameters include at least three of wind speed, visibility, humidity, temperature and precipitation, the road parameters include at least four of friction of the road surface, hardness of the road surface, type of road surface, condition of the road surface, traffic and accidents, and the vehicle parameters include at least three of speed, gear level, dimensions, model, make and tire wear.

13. The vehicle helping system of claim 11 further comprising, responsive to a navigational input from the vehicle, receiving and storing driver parameters, the central computing server further comprising evaluating the current driver parameters along with the current environmental parameters, road parameters and vehicle parameters with respect to information stored in the knowledgebase to identify appropriate information to handle various driving situations and providing to a vehicle at least one suggestion from the appropriate information for handling a particular driving situation.

14. The vehicle helping system of claim 13 wherein the driver parameters include at least two of driver experience, driver age and disability of the driver.

* * * * *